United States Patent [19]
Bernhardt et al.

[11] Patent Number: 5,910,245
[45] Date of Patent: Jun. 8, 1999

[54] BIOREMEDIATION WELL AND METHOD FOR BIOREMEDIATION TREATMENT OF CONTAMINATED WATER

[75] Inventors: Bruno Bernhardt, Reutlingen, Germany; William G. Langley; Eric J. Klingel, both of Charlotte, N.C.; James G. Mueller; Fayaz Lakhwala, both of Gulf Breeze, Fla.

[73] Assignee: IEG Technologies Corp., Charlotte, N.C.

[21] Appl. No.: 08/779,135

[22] Filed: Jan. 6, 1997

[51] Int. Cl.$^6$ ....................................................... C02F 3/30
[52] U.S. Cl. ...................... 210/170; 210/188; 210/195.1; 210/605; 210/747; 210/901; 405/128
[58] Field of Search ........................... 210/603, 605, 210/610, 617, 618, 621, 629, 630, 631, 747, 150, 151, 170, 188, 194, 195.1, 202, 258, 259, 901; 405/128

[56] References Cited

U.S. PATENT DOCUMENTS

| | | | |
|---|---|---|---|
| 3,846,289 | 11/1974 | Jeris et al. | 210/618 |
| 4,009,098 | 2/1977 | Jeris | 210/618 |
| 4,315,821 | 2/1982 | Climenhage | 210/605 |
| 4,522,722 | 6/1985 | Nicholas | 210/605 |
| 4,683,064 | 7/1987 | Hallberg et al. | 210/747 |
| 4,696,747 | 9/1987 | Verstracte et al. | 210/617 |
| 4,756,831 | 7/1988 | Menzel et al. | 210/617 |
| 4,765,902 | 8/1988 | Ely et al. . | |
| 4,850,745 | 7/1989 | Hater et al. . | |
| 4,892,664 | 1/1990 | Miller | 210/747 |
| 4,919,815 | 4/1990 | Copa et al. | 210/605 |
| 4,933,076 | 6/1990 | Oshima et al. | 210/605 |
| 4,945,988 | 8/1990 | Payne et al. . | |
| 4,992,174 | 2/1991 | Caplan et al. . | |
| 5,006,250 | 4/1991 | Roberts et al. | 210/747 |
| 5,134,078 | 7/1992 | Sieksmeyer et al. . | |
| 5,173,092 | 12/1992 | Rudder | 210/747 |
| 5,178,491 | 1/1993 | Graves et al. . | |
| 5,221,159 | 6/1993 | Billings et al. . | |
| 5,228,998 | 7/1993 | DiClemente et al. | 210/617 |
| 5,277,815 | 1/1994 | Beeman . | |
| 5,302,286 | 4/1994 | Semprini et al. | 210/170 |
| 5,344,557 | 9/1994 | Scanzillo | 210/170 |
| 5,380,126 | 1/1995 | Bernhardt | 210/170 |
| 5,384,048 | 1/1995 | Hazen et al. . | |
| 5,456,550 | 10/1995 | Devlin | 210/747 |
| 5,472,294 | 12/1995 | Billings et al. . | |

Primary Examiner—Christopher Upton
Attorney, Agent, or Firm—Kennedy Covington Lobdell & Hickman, LLP

[57] ABSTRACT

An apparatus for the in situ, sequential anaerobic and aerobic treatment of contaminated water is disclosed which includes definition of a treatment flow path for water from a source of contaminated water and division of this flow path into a first region and a second region. An anaerobic bioreactor is disposed in the first region for anaerobic biodegradation of the contaminants within the water. An aerobic bioreactor is disposed in the second region, for aerobic biodegradation of contaminants within the water. The apparatus also causes the water to flow from the source of contaminated water into the treatment flow path, through the anaerobic bioreactor in the first region, through the aerobic bioreactor in the second region, and then back to the source of contaminated water. Also disclosed is a method for treating contaminated water, which includes the steps of defining a treatment flow path for water from a source of contaminated water, and dividing the flow path into distinct anaerobic and aerobic regions. Then the water is drawn from the area of contaminated water into the anaerobic region and anaerobically treating the contaminated water. Then the anaerobically treated water is caused to flow to the aerobic region, and the contaminated water is aerobically treated. Then the treated water is returned to the area of contaminated water.

2 Claims, 1 Drawing Sheet

BIOREMEDIATION WELL AND METHOD FOR BIOREMEDIATION TREATMENT OF CONTAMINATED WATER

BACKGROUND OF THE INVENTION

The present invention relates to an arrangement and method for treating contaminated groundwater and, more particularly, to an arrangement and method for in situ bioremediation treatment of the contaminated groundwater.

Subsurface soil and groundwater, as well as ponds, lakes, streams, etc., are increasingly becoming contaminated with undesirable substances, such as hydrocarbons. The hydrocarbon contaminants often trace their source to spills of hydrocarbons, such as by oil dumping, leaks and breaks in pipes transporting such materials, or as a result of improper disposal of waste hydrocarbons. It is becoming increasingly important to remove such hydrocarbon and other contaminants from the soil and groundwater.

Conventional methods of removing contaminants from the soil and groundwater include pumping water from a well to the surface, treating the contaminated water above the surface to remove the hydrocarbon contaminants, and then returning the treated water to the subsurface region. Such method is expensive and requires a significant amount of above-ground equipment to accomplish the desired result. Another conventional method is to remove the soil with the contaminants and to backfill with uncontaminated soil. Problems with this method include disposing of the contaminated soil and resource requirements (e.g., cost).

It is becoming increasingly important to provide methods for treating contaminated water that are less expensive and require significantly less equipment because the number of contaminated sites for which treatment is needed is high. To accommodate a less expensive and less equipment-intensive requirement, in situ treatment wells have been developed that strip volatile organic compounds from the groundwater without removing the groundwater to the surface. For example, Bernhardt U.S. Pat. No. 5,116,163 illustrates such an arrangement for driving out volatile impurities from the groundwater. Bernhardt '163 teaches the use of pressurized air or other gas bubbled through the contaminated groundwater to strip volatile organic compounds from the contaminated water. The volatile organic compounds are then removed from the well with the air and treated above the surface, without removing any of the water from the well.

While this system works well to strip volatile organic compounds from the contaminated groundwater, it still requires a significant amount of above-ground treatment processes for the treatment of the removed contaminants. Removing the volatile organic compounds from the soil and groundwater merely moves the contamination problem from below ground to above ground. The contaminants are still present and pose disposal problems, and the contaminated air removed from the well is still treated by conventional means, such as passing the air through activated charcoal filtration systems. To reduce or eliminate the above-ground equipment necessary to treat the organic compounds, systems have been developed to treat these organic hydrocarbons within the well complex itself.

Processes have been developed to take advantage of native aerobic microorganisms within the soil to treat the organic compounds before they are withdrawn from the subsurface area. Such use of microorganisms to accomplish biological treatment of contaminated groundwater is illustrated in Ely et al U.S. Pat. No. 4,765,902, Hater et al U.S. Pat. No. 4,850,745, Caplin et al U.S. Pat. No. 4,992,174, Graves et al U.S. Pat. No. 5,178,491, Billings et al U.S. Pat. No. 5,221,159, and Billings et al U.S. Pat. No. 5,472,294. These patents illustrate providing nutrients and oxygen to aerobic microorganisms already present and dispersed throughout the ground in the vicinity of the contaminated groundwater or providing microorganisms from above the surface to the natural subsurface areas containing the contaminated groundwater.

These processes appear to be somewhat effective for the treatment of organic compounds that are susceptible to aerobic biological treatment. However, there is a significant body of hydrocarbons, particularly halogenated aromatic and aliphatic hydrocarbons, that are not readily susceptible to such aerobic biodegradation. Many of these compounds are susceptible to biological transformation under anaerobic or anoxic environments. Thus, provision of an anaerobic biological treatment step would enable these compounds to also be broken down and treated.

Processes have been developed to provide for anaerobic biological treatment of contaminated groundwater. Hazen et al U.S. Pat. No. 5,384,048 illustrates providing an oxygenated fluid to indigenous subsurface microorganisms to create a generally aerobic environment, but leaving pockets that are anaerobic. Payne et al U.S. Pat. No. 4,945,988 discloses providing an anaerobic area of bioremediation within the aquifer and an aerobic area of bioremediation in the vadose zone. This system utilizes native microorganisms and includes the injection of substantially oxygen-free air into the aquifer to retard formation of aerobic bacteria and the injection of oxygen-rich air into the vadose zone to stimulate growth of aerobic bacteria. This process uses native microorganisms to treat the groundwater outside of the injection points and to draw volatilized contaminants through the soil and out through withdrawal wells which terminate in the vadose zone.

Often, the compound that undergoes anaerobic biodegradation yields products that are further susceptible to biodegradation by aerobic microorganisms at a faster rate. Thus, some compounds, such as halogenated hydrocarbons, may be most effectively treated by providing for sequential anaerobic and aerobic biodegradation. Complete, sequential anaerobic and aerobic biodegradation optimally results in complete degradation to carbon dioxide and water.

Beeman U.S. Pat. No. 5,277,815 illustrates anaerobic and aerobic treatment of groundwater contaminants utilizing indigenous anaerobic and aerobic bacteria to biodegrade halogenated hydrocarbons in the subsurface aquifers. This process utilizes the natural bioreactor and indigenous microorganisms and natural flow of the groundwater and its contaminants. Once the anaerobic biodegradation proceeds to a certain point, oxygen is added to change the anaerobic conditions to aerobic conditions.

Utilization of natural bioreactors, in other words, natural circulation flow and reliance upon indigenous microorganisms, to accomplish the sequential anaerobic and aerobic bioremediation is inefficient. Also, use of natural bioreactors does not easily lend itself to the parameter control necessary for optimal removal of contaminants. Such parameters include the oxygen and nutrient content, the microorganisms concentration, temperature, and residence time within the area of bioremediation. For example, the residence time of the contaminated water within the natural anaerobic bioreactor may be insufficient to fully dehalogenate the hydrocarbons in order for aerobic bioremediation to be effective. Further, reliance upon the natural bioreactor reduces efficiency because of the possible migration of the anaerobically treated hydrocarbons away from the aerobic region, without being sufficiently treated by the natural aerobic bioreactor.

Thus, it would be desirable to provide for an in situ, sequential anaerobic, aerobic bioreactor with sufficient residence time in both the anaerobic and the aerobic bioreactors to ensure high efficiency of bioremediation of the halogenated volatile and non-volatile organic contaminants contained within the groundwater. It is also desirable to ensure that the organic contaminants, such as halogenated hydrocarbons, that are inefficiently treated by the use of aerobic microorganisms are sufficiently treated in an anaerobic bioreactor prior to being directly forwarded to an aerobic bioreactor in order to provide complete treatment of the contaminants.

Sieksmeyer et al U.S. Pat. No. 5,134,078 attempts to provide some parameter control by disclosing a method and apparatus for pumping contaminated water from a well to a surface process in which the contaminated water is transferred to a rotating biological contactor in an anaerobic environment, and then fed to another rotating biological contactor in an aerobic environment. Then the water is slowly filtered through a percolation basin sunk into the soil in order for the treated water to return to the groundwater region. Such system requires significant above-ground equipment and significant available space to locate the rotating biological contactors, the percolation pond, and the rest of the equipment associated with this system. Also, this process has the disadvantages associated with all processes in which contaminated water is removed from the well—there exists a possibility of a spillage of the contaminated water and returning the contaminants to the ground through the spilled contaminated water, and the equipment and operating costs associated with pumping the water above ground are high.

Thus, it is desirable to provide an in situ bioremediation well in which the contaminated groundwater is first pumped to an anaerobic bioreactor of known capacity and efficiency to anaerobically treat the contaminated groundwater, for example, to facilitate dehalogenation of halogenated hydrocarbons, then to provide this anaerobically pre-treated contaminated water to an aerobic bioreactor of known capacity and efficiency to aerobically treat the products of partial dehalogenation and/or partial degradation and to return directly the treated groundwater to the vicinity from which the water was originally drawn, while being able to control various parameters in both bioreactor regions to ensure efficient removal of contaminants.

SUMMARY OF THE INVENTION

It is an object of the present invention to provide an apparatus and a method for in situ bioremediation of contaminated water. It is a further object of the present invention to provide sequential anaerobic and aerobic treatment of the contaminated water to improve the efficiency of the removal of contaminants, such as halogenated hydrocarbons, that are not readily susceptible to either anaerobic or aerobic biodegradation individually. It is yet a further object of the present invention to direct the flow of the water through the treatment system in order to provide predictable and efficient bioremediation of the contaminated water.

The invention is an apparatus and a method for the treatment of contaminated water, with a treatment flow path for water from a source of contaminated water and division of this flow path into a first region and a second region. An anaerobic bioreactor is disposed in the first region for anaerobic biodegradation of contaminants within the water. An aerobic bioreactor is disposed in the second region for aerobic biodegradation of contaminants (or their anaerobic break-down products) within the water. The apparatus includes pumps or the like for causing the water to flow from the source of contaminated water into the treatment flow path, through the anaerobic bioreactor in the first region, through the aerobic bioreactor in the second region, and then back to the source of contaminated water, without removal from the aquifer.

Preferably, the invention utilizes vertical groundwater circulation well technology wherein an anaerobic bioreactor is situated in an isolated lower region of a groundwater circulation well. Contaminated groundwater is drawn into the lower region of the well and forced to travel through the anaerobic bioreactor, wherein it is biologically treated by anaerobic microorganisms, such as to dehalogenate halogenated hydrocarbons. The anaerobically treated water is then returned to the lower region of the well, wherein a portion thereof is recirculated through the anaerobic bioreactor and a different portion thereof is pumped to an isolated upper region of the well. Within the upper region of the well, the anaerobically treated contaminated groundwater passes through an aerobic bioreactor, wherein it is biologically treated by aerobic microorganisms. Preferably, the treated groundwater is then passed through a stripping reactor to strip any remaining volatile hydrocarbons from the treated groundwater, to aerate the groundwater, to adiabatically cool the groundwater, and to return the groundwater to the upper region. Some of the oxygenated, treated groundwater is then returned to the ground region, and some water is recycled through the aerobic bioreactor and stripping reactor.

BRIEF DESCRIPTION OF THE DRAWING

The single drawing FIGURE is a schematic illustration of a preferred embodiment of the present invention.

DETAILED DESCRIPTION OF THE PREFERRED EMBODIMENT

Figure 1:
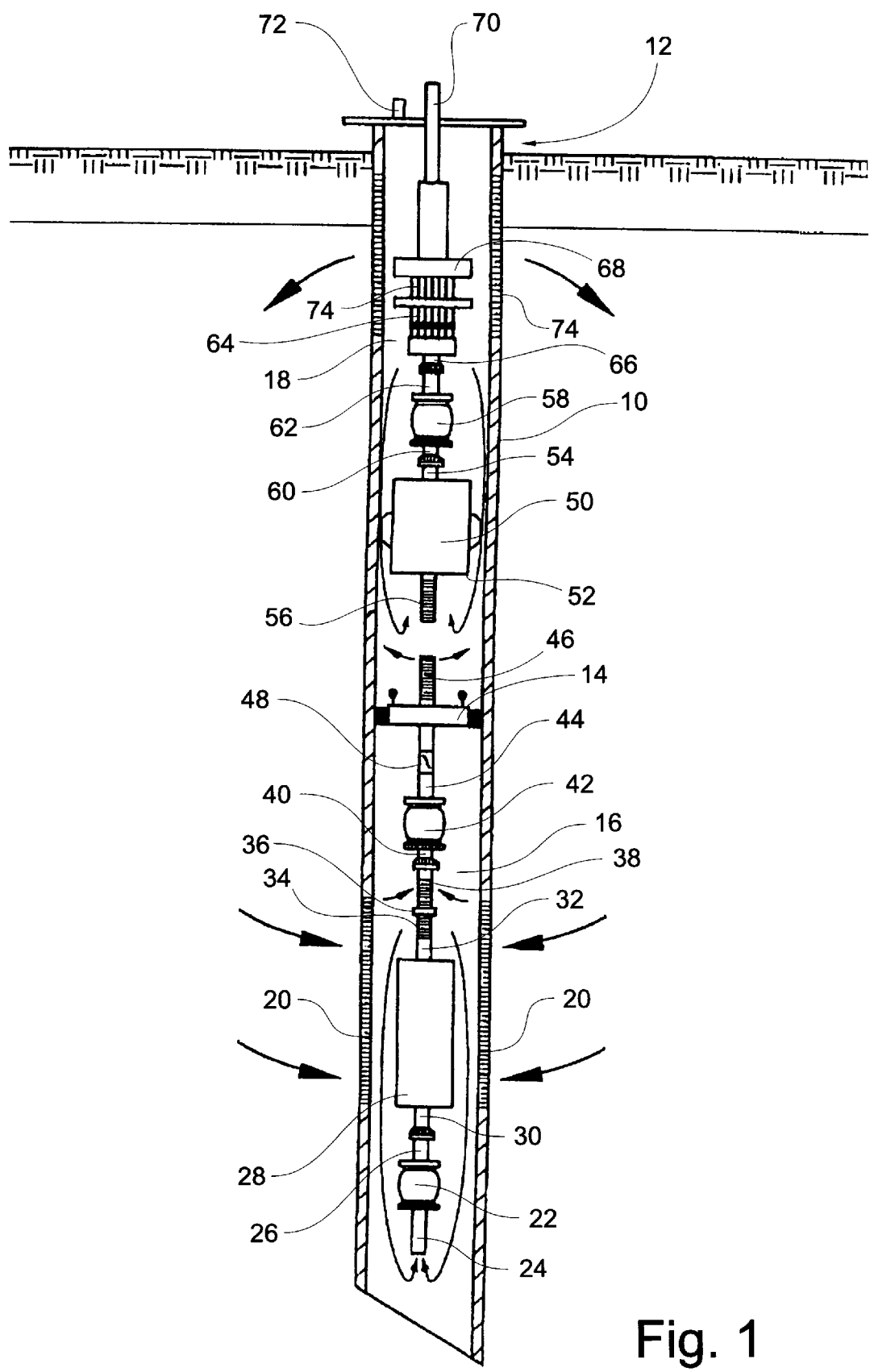

While the present invention may be used to treat contaminated water in a variety of different situations, for example, a standing body of water such as a pond or a lake, a moving body of water such as a river or creek, or underground water, the invention will be detailed with respect to its use for treating contaminated groundwater. FIG. 1 illustrates an embodiment of the present invention wherein a casing 10 is disposed within an opening 12 in a region of ground 11 wherein contaminated water is found. An inflatable packer 14 is disposed at a predetermined location within well casing 10 to divide the interior of well casing 10 into a first cell 16 and a second cell 18.

The casing 10 in the area of the first cell 16 is provided with lower screen 20 through which the water is drawn into the first cell 16 from the surrounding ground region 11. A first pump 22 having an inlet 24 and an outlet 26 is disposed within the first cell 16. The first pump inlet 24 draws water from the first cell 16 and pumps it out the first pump outlet 26.

Also disposed within the first cell 16 is an anaerobic bioreactor 28, for anaerobically treating the contaminated groundwater within first cell 16. The anaerobic bioreactor has an inlet 30 and an outlet 32. The anaerobic bioreactor inlet 30 is connected to the first pump outlet 26, such that the water pumped through first pump outlet 26 enters the anaerobic bioreactor 28 through anaerobic bioreactor inlet 30. Within the anaerobic bioreactor 28, the contaminated water undergoes anaerobic bioremediation, as is discussed below in greater detail. The water in the first cell 16 is kept substantially oxygen free to facilitate anaerobic bioremediation.

After traveling through the anaerobic bioreactor 28, the water exits the anaerobic bioreactor 28 through anaerobic bioreactor outlet 32. Connected to anaerobic bioreactor outlet 32 is a cylindrical first screen 34 through which the water exits into the first cell 16. Connected to the opposite end of the cylindrical first screen 34 is a solid disc 36 that seals one end of the cylindrical first screen 34. Connected to the solid disc 36 on the opposite side from cylindrical first screen 34 is a cylindrical second screen 38. Connected at the opposite end of second screen 38 from the solid disc 36 is an inlet 40 to a second pump 42 having an outlet 44.

The second pump 42 draws water from the first cell 16, through the second screen 38 and the second pump inlet 40, and pumps this water through the second pump outlet 44, a cylindrical third screen 46 attached to second pump outlet 44, and into the second cell 18. A check valve 48 is provided in the second pump outlet 44 to ensure that the oxygenated water from the second cell 18 is prevented from reentering the deoxygenated water in the first cell 16, so that an anaerobic environment may be maintained. In a preferred embodiment, the second pump 42 is located in the first cell 16; however, the second pump 42 may also be located in the second cell 18, so long as the second pump 42 draws water from the first cell 16 and exits water into the second cell 18. Likewise, the check valve 48 may be located within the second pump inlet 40, so long as it prevents the flow of water from the second cell 18 to the first cell 16.

An aerobic bioreactor 50 is disposed within the second cell 18 and has an inlet 52 and an outlet 54. The aerobic bioreactor inlet 52 is provided with a cylindrical fourth screen 56 through which water from the second cell 18 is drawn into the aerobic bioreactor 50. Within the aerobic bioreactor 50, the water undergoes aerobic biodegradation, as is discussed below in greater detail. The water in the second cell 18 is kept substantially oxygen rich to facilitate aerobic bioremediation.

Disposed within the second cell 18 is a third pump 58 having an inlet 60 and an outlet 62. The third pump inlet 60 is connected to the aerobic bioreactor outlet 54 and the third pump 58 draws water from the second cell 18 through the aerobic bioreactor 50 and the third pump inlet 60.

A stripping reactor 64 is disposed within the second cell 18 with a water inlet 66 connected to the third pump outlet 62 and a liquid outlet 68 for returning liquid water to the second cell 18 and an air inlet pipe 70 extending outside the opening 12. A vapor outlet 72 extending outside the opening 12 is provided for aspiration of volatile hydrocarbons and other volatile contaminants and gaseous biodegradation byproducts from the bioremediation process. The well casing 10 in the area of the second cell 18 is provided with upper screen 74 to allow the return of treated water to the ground region 11. The stripping reactor 64 strips untreated volatile hydrocarbons from the anaerobically and aerobically treated contaminated groundwater, aerates the treated water, and adiabatically cools the water.

Thus, the contaminated water is treated by defining a treatment flow path with the use of the casing 10 placed into the opening 12 in the ground region 11, and dividing this flow path by the use of the inflatable packer 14 into an anaerobic region in the first cell 16 and an aerobic region in the second cell 18. Contaminated water is drawn from the ground region 11 into the treatment flow path through lower screens 20 into the anaerobic region in the first cell 16. This contaminated water is then treated anaerobically within the anaerobic bioreactor 28. The anaerobically treated water is then pumped from the anaerobic region in the first cell 16 to an aerobic region in the second cell 18 by second pump 42. Then the water is drawn through aerobic bioreactor 50, wherein the contaminated water is aerobically treated. Then the treated water is passed through a stripping reactor 64 to strip volatile hydrocarbons from the treated water, to aerate the treated water, and to adiabatically cool the water after the step of aerobically treating the water. Then the water that has been sequentially anaerobically and aerobically treated is returned to the ground region 11 through the upper screen 74.

By using the apparatus and method of the present invention, contaminated water with contaminants that are not susceptible to typical aerobic biodegradation found in some in situ treatment environments are sequentially treated with anaerobic biodegradation and then aerobic biodegradation. Chemicals such as polychlorinated biphenyls, tetrachloroethylene, other halogenated hydrocarbons, and nitro-aromatics are generally resistant initially to aerobic biological catalysis but are susceptible to biological transformation under anaerobic or anoxic environments. Thus, the anaerobic treatment serves to facilitate dehalogenation of the halogenated hydrocarbons, and the dehalogenated hydrocarbons then exit the anaerobic region and enter the aerobic region, where they are aerobically treated to facilitate the oxidation and mineralization of these dehalogenated hydrocarbons and other organic compounds not readily subject to anaerobic catalysis, for example, certain diesel fuel constituents.

Reductive dehalogenation processes have been described for the transformation of myriad chemicals that are not readily subject to oxidative reactions. For example, highly chlorinated PCBs (such as 2,3,5,2',5'-polychlorinated biphenyl) typically persist under aerobic environments because the recognized sites of reactive oxygenases are sterically blocked by the presence of the chlorine atoms. However, these same chemicals are susceptible to reductive halogenation reactions yielding biphenyl or biphenyl-based moieties containing fewer chlorine atoms per biphenyl unit. These reductive dehalogenation reactions have been shown to occur under a variety of anaerobic conditions. Thus, managing the in situ microbiology and reduction/oxidation potential via sequential anaerobic/aerobic bioreactors allows one to effectively treat groundwater containing mixtures of readily oxidizable and persistent organic contaminants.

Microorganisms are used in immobilized form (attached or encapsulated) when used in the in situ bioremediation well of the present invention. The method of immobilization is based on the ability of the selected microorganism to form a biofilm. For a good biofilm former, biosupports such as granular activated carbon, diatomaceous earth, silica sand, glass beads, ceramic rings, plastic rings (polyvinyl chloride), microporous plastic sheets, and microporous plastic discs may be used. In the case of a poor biofilm former, the cells are encapsulated or immobilized in microporous support material such as calcium alginate, polyurethane, or polyacrylamide hydrazide. In situ bioreactors can be designed to accommodate and house indigenous microflora or designed to be inoculated with any of a wide variety of specially selected microflora strains, depending upon typical design criteria, such as type of contamination to be treated, environmental considerations, and microflora availability.

Depending on cell immobilization method, type of contaminants, and concentration of contaminants, three reactor configurations are utilized. These reactor configurations are packed bed, fluidized bed, and tangential flow type.

Packed bed reactors are used when high density granular activated carbon, glass beads, diatomaceous earth, polyurethane, calcium alginate, polyacrylamide hydrazide, and microporous plastic discs are utilized as biosupport matrices. Fluidized bed reactors are used when low density granular activated carbon, ceramic rings, polyvinyl chloride rings, low density diatomaceous earth, and silica sand are utilized as biosupport matrices. Tangential flow reactors are used when microporous plastic sheet is utilized for cell immobilization. This biosupport is used as spiral cartridges.

Critical environmental parameters can be monitored and controlled to maintain optimum bioreactor performance in both the anaerobic and aerobic regions within the apparatus. In general, a transition from aerobic to anaerobic conditions occurs with increasing depth in an aquifer. A certain minimum depth of the apparatus is necessary to meet the space requirements of staged bioreactors and to ensure that two distinct, aerobic and anaerobic zones can be established.

The anaerobic stage of the treatment sequence will require a primary substrate such as methanol, acetate, or the like. If a suitable primary substrate is not already available, it can be added at the lower zone in a solid, liquid, or gaseous form. When aerobic conditions prevail at the depth of the lower bioreactor in the first cell 16, oxidation of the primary substrate or introduction of other oxygen-reducing compounds will bring about anaerobic conditions. Higher temperatures, which accelerate anaerobic biotransformation rates, are favored in the first cell 16. Given that the temperature and the solubility of oxygen are inversely related, lower temperatures are desirable in the second cell 18. When biotransformations generate significant amounts of acidity or alkalinity, pH can also be controlled in each bioreactor 28,50.

Flow rate and mean residence time are controlled by the pumps 22,42,58 within the apparatus. Performance within each cell 16,18 and the system as a whole can be simulated by applying appropriate kinetic relationships for each reactor type and configuration. Given that anaerobic processes are slower than aerobic processes, longer mean residence time in the first cell 16 is achieved by using a larger volume for the first cell 16.

In operation, the contaminated water is drawn from the ground region 11 into the first cell 16 through the lower screens 20 by the flow through the second pump 42. The first pump 22 circulates water through the anaerobic bioreactor 28 at a rate higher than the flow through second pump 42, allowing a greater number of passes through the anaerobic bioreactor and increased water temperature to enhance the anaerobic degradation in this cell. Thus, because the flow rate through first pump 22 is higher than the flow rate through second pump 42, some of the anaerobically treated water exiting the anaerobic bioreactor 28 through the first screen 34 is recirculated through the anaerobic bioreactor 28. This improves dehalogenation and anaerobic biotransformations of the contaminants within the water. The second pump 42 pulls water into the second screen 38, and pumps it past the check valve 48 through the second screen 46 into the second cell 18.

Water that enters the second cell 18 is then pulled into the fourth screen 56 along with recycled water that has been aerated by the stripping reactor 64. The third pump 58 operates at a circulating rate that is higher than the first pump 22 and the second pump 42 to allow for increased number of passes through the aerobic bioreactor 50 and allow for increased levels of dissolved oxygen in the water to enhance the aerobic degradation. After the water is pulled into the fourth screen 56 and the aerobic bioreactor inlet 52, it passes through the aerobic bioreactor 50 and then upward through the third pump 58 into the stripping reactor 64 where the stripping of volatile hydrocarbons, aeration, and adiabatic cooling take place. A portion of this treated water, equaling the flow through pumping rate of the second pump 42, exits the upper screen 74 and the remaining treated water re-enters the second cell 18 and is recirculated through the fourth screen 56 and the aerobic bioreactor 50, along with the water entering the second cell 18 from the first cell 16.

The treated water exiting the upper screen 74 moves in a three-dimensional flow path forming a circulation cell in the ground region 11 with water exiting the upper screen 74 and entering the lower screens 20. The groundwater entering the lower screens 20 consists of new upgradient groundwater flowing in at the aquifer flow rate and recycled groundwater from within the apparatus. The total flow of these two groundwater components equals the rate of flow through second pump 42.

The establishing of a three-dimensional circulation cell minimizes stagnation zones along the flow paths which maximizes contaminant transport in the groundwater stream and reduces the number of pore volume flushes needed to remove the dissolved phase and adsorbed phase hydrocarbons. The three-dimensional flow cell also mobilizes free phase hydrocarbons as colloids or adhered to colloids into the first cell 16 which will reduce the removal time for the hydrocarbons.

While the invention herein has been described with respect to utilization as a groundwater circulation well disposed within a ground region, it is to be recognized that similar results may be had if the well is disposed within a standing or moving body of water. However, in these circumstances, the dynamics of the extent of the treatment of water surrounding the well is affected by the flow dynamics of the water surrounding the well, such as if the apparatus is secured in a moving body of water. It is also to be recognized that such apparatus could be placed in the bed of a moving or standing body of water to treat the groundwater located below the bed of such body of water, which would include treatment of the body of water itself by typical water circulation patterns.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An apparatus for the treatment of contaminated groundwater within an aquifer through an opening in a region of ground in the area of the aquifer, comprising:

a. a casing disposed within said opening, said casing having a first screened section, through which the water is drawn from the ground region, and a second screened section, through which the water is returned to the ground region;
b. means for separation disposed at a predetermined location within said casing between the first screened section and the second screened section, sealingly separating the opening into a first cell and a second cell;
c. a first pumping means, with an inlet and an outlet, disposed in the first cell, said inlet drawing water from the first cell;
d. an anaerobic bioreactor, having an inlet and an outlet, disposed in the first cell, for anaerobic biodegradation of groundwater contaminants, the anaerobic bioreactor inlet connected to the first pumping means outlet and the anaerobic bioreactor outlet opening into the first cell;
e. a second pumping means, with an inlet and an outlet, disposed such that the second pumping means inlet draws water from the first cell and the second pumping means outlet expels water to the second cell, causing groundwater to flow from the first cell to the second cell, the second pumping means being provided with a check valve to prevent backflow of water from the second cell to the first cell;
f. an aerobic bioreactor, having an inlet and an outlet, disposed in the second cell, for aerobic biodegradation of contaminants within the groundwater, said aerobic bioreactor inlet drawing water from the second cell;
g. a third pumping means, with an inlet and an outlet, disposed in the second cell, said third pumping means inlet being connected to the aerobic bioreactor outlet; and
h. a stripping reactor, disposed in the second cell, connected to the third pumping means outlet, the stripping reactor to strip volatile hydrocarbons and gaseous biodegradation byproducts from the anaerobically and aerobically treated contaminated groundwater, to aerate the groundwater, and to adiabatically cool the groundwater, the reactor having a liquid outlet to return the groundwater to the second cell and a vapor outlet extending outside the opening for aspiration of volatile hydrocarbons and other volatile contaminants and gaseous biodegradation byproducts.

2. An apparatus for the treatment of contaminated groundwater within an aquifer through an opening in a region of ground in the area of the aquifer, comprising:

a. a casing disposed within said opening, said casing having a first screened section, through which the water is drawn from the ground region, and a second screened section, through which the water is returned to the ground region;
b. an inflatable packer disposed at a predetermined location within said casing between the first screened section and the second screened section, sealingly separating the opening into a first cell and a second cell;
c. a first pump, with an inlet and an outlet, disposed in the first cell, said first pump inlet drawing water from the first cell;
d. an anaerobic bioreactor, having an inlet and an outlet, disposed in the first cell, for anaerobic biodegradation of groundwater contaminants, said anaerobic bioreactor inlet connected to the first pump outlet, said anaerobic bioreactor outlet having a first screen through which the groundwater exits to reenter the first cell, said first screen terminating in a solid disk;
e. a second pump, with an inlet and an outlet, disposed in the first cell, said second pump outlet extending upward through the inflatable packer to cause groundwater to flow from the first cell to the second cell, said second pump inlet having a second screen connected to the solid disk opposite the first screen, said second pump outlet having a check valve to prevent backflow of water and having a third screen, through which the groundwater from the first cell is introduced to the second cell;
f. an aerobic bioreactor, having an inlet and an outlet, disposed in the second cell, for aerobic biodegradation of contaminants within the groundwater, said aerobic bioreactor inlet having a fourth screen, through which the groundwater entering the aerobic bioreactor passes;
g. a third pump, with an inlet and an outlet, disposed in the second cell, said third pump inlet being connected to the aerobic bioreactor outlet;
h. a stripping reactor, disposed in the second cell, connected to the third pump outlet, said stripping reactor to strip volatile hydrocarbons from the anaerobically and aerobically treated contaminated groundwater, to aerate the groundwater, and to adiabatically cool the groundwater, said reactor having a liquid outlet to return the groundwater to the second cell and a vapor outlet extending outside the opening for aspiration of volatile hydrocarbons and other volatile contaminants and gaseous biodegradation byproducts.

* * * * *